Jan. 27, 1953     R. R. SHULER     2,626,708
VEGETABLE HARVESTER CLEANING ATTACHMENT
Filed Oct. 12, 1950     2 SHEETS—SHEET 1
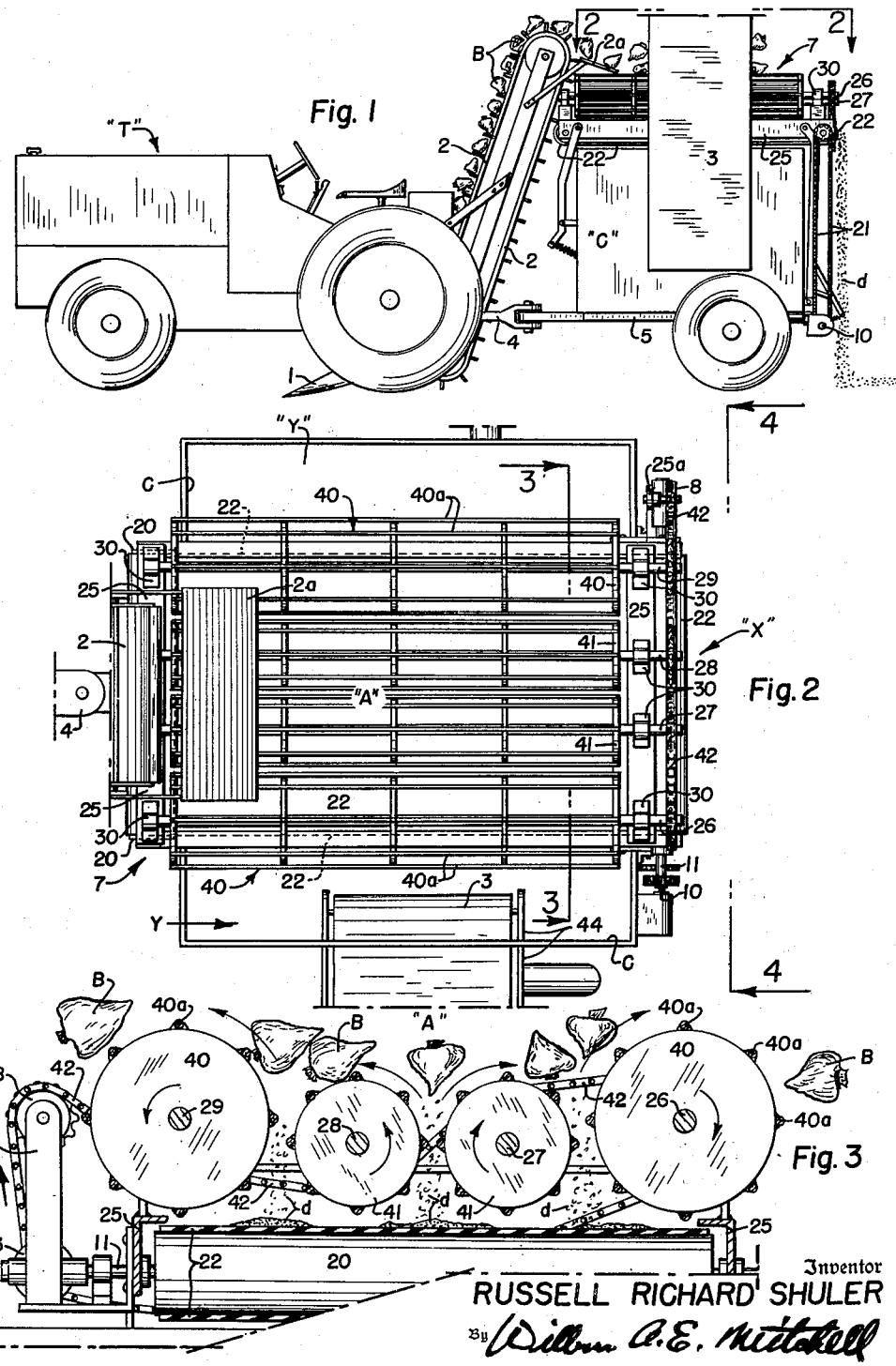
Inventor
RUSSELL RICHARD SHULER
By Wilbur A. E. Mitchell
Attorney Jan. 27, 1953  R. R. SHULER  2,626,708
VEGETABLE HARVESTER CLEANING ATTACHMENT
Filed Oct. 12, 1950  2 SHEETS—SHEET 2
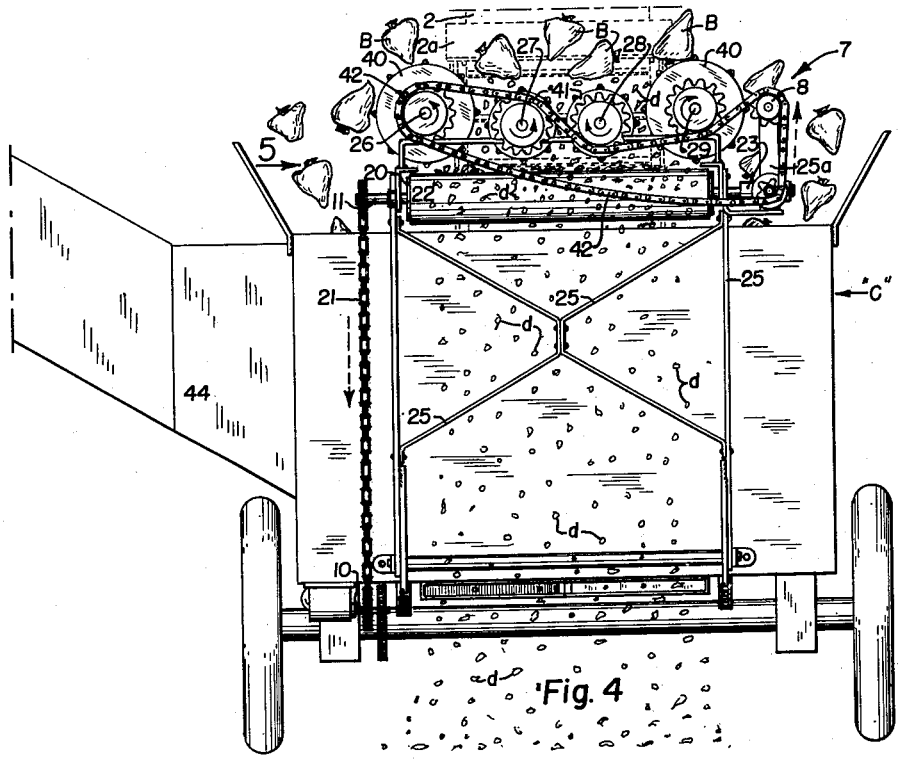
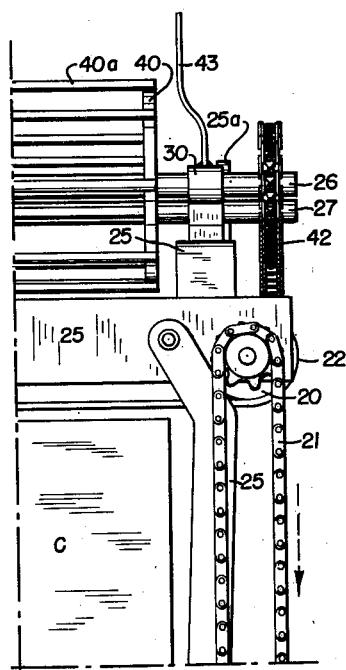
Inventor
RUSSELL RICHARD SHULER
By Wilbur A. E. Mitchell
Attorney Patented Jan. 27, 1953

2,626,708

UNITED STATES PATENT OFFICE 2,626,708

VEGETABLE HARVESTER CLEANING ATTACHMENT

Russell Richard Shuler, Keensburg, Colo.

Application October 12, 1950, Serial No. 189,827

1 Claim. (Cl. 209—255)

This invention relates to farm machinery, and more particularly to the automatic digger and loader type of such machinery used to harvest tuber vegetables, such as potatoes, sugar beets, carrots, and the like, in which there is a loader cart pulled by the digger machine, and a conveyor from the latter taking the dug vegetables upwardly to a point above the loader cart, from which point they fall into the cart.

It has been found that too much dirt adheres to the dug vegetables, and is emptied into the loader cart along with them, resulting in the necessity of a cleaning process before they can be placed into bags, or otherwise made ready for shipment or use, after they are emptied from the said loader cart. That cleaning process entails needless time and expense.

I have, therefore, designed an attachment to be used in conjunction with said loader cart, at the point above the open top thereof and just below the discharge end of the loader conveyor from the digger machine, as a part of that cart, for cleaning the vegetables as they fall from the conveyor into that cart. Said attachment is designed to separate the dirt from the vegetables, and to convey and discharge the dirt outside of the cart, and yet to permit the cleaned vegetables to fall into the cart.

It is therefore a principal object of this invention to provide an attachment for automatically cleaning the tubers at their point of fall from the digger conveyor into the loader cart, by separating the dirt therefrom and conveying and discharging the dirt separately to the outside of the cart, so that only cleaned tubers are loaded in the loader cart.

It is a further object of this invention to provide such an attachment in the form of horizontal-spaced-apart squirrel cage sieve-type rotatable drums, in combination with a dirt conveyor belt, adapted to cause a bouncing cleaning motion of the tubers on the said drums.

Another object is the provision of a plurality of such roller drums, placed in a novel formation, whereby the tubers will thereby be bounced upwardly from one thereof onto and across another thereof, with said drums having suitable bars.

Further objects will be apparent from the following detailed description of my invention, reference being had to the accompanying drawings, in which:

Figure 1 is an elevational view of a tractor-digger machine, having the loader cart C, and the latter having my attachment 7 thereon;

Figure 2 is an enlarged plan view of the cart and my attachment;

Figure 3 is an enlarged vertical cross-sectional view taken on the line 3—3 of Figure 2, looking in the direction of the arrows;

Figure 4 is an elevational end view, as indicated by the arrows of Figure 2; and Figure 5 is a partial vertical elevational view, as indicated by the arrow 5 of Figure 4.

Throughout the drawings like characters of reference have been used to represent like parts. I illustrate the use of my invention with a sugar beet harvesting machine, though same is not limited thereto.

The conventional sugar beet harvesting machine comprises a tractor T, having the beet digging apparatus 1 attached thereunder, and an elevator conveyor 2 which carries the dug beets up to the top of a loader cart C. Cart C is attached to and pulled by the tractor directly behind the tractor, and the cart is of the open type cart into which the beets directly fall from the conveyor 2. Draw bar 4 of the tractor is connected with the draw bar 5 of the cart. The cart has a discharge conveyor, from its bottom thereof to an elevated outside point, the conveyor being indicated as 3. All of the parts thus far described being conventional as in use today, and comprise no part of my attachment invention.

My cleaning attachment is indicated, generally, as 7. It is placed just above the open top side of the loader cart C, in such a way as not to entirely prevent the beets from falling therefrom, as will be explained, into the cart; or, in other words, it only partially covers the exposed open top of the cart. Suitable frame structures, 25 and 25a, are provided for journalling two spaced apart pairs of squirrel-cage sieve-type roller drums, 40 and 41, by journalling shafts 26, 27, 28 and 29. The two outer drums 40 comprise one pair, and the two inner drums 41 comprise the other pair. Shaft 26 is attached to drum 40 on chain 21 side, shaft 27 to drum 41 adjacent thereto, shaft 28 to the next drum 41 and shaft 29 to the other outer drum 40, each shaft being keyed to its drum to cause rotation therewith. Each of said shafts is suitably journalled for rotation by a journal bearing 30. Each of those shafts also has an outer chain cog wheel keyed thereto. It is to be noted that the inner pair of sieve drums, 41, are of uniform diameter and in one plane horizontally; and that the other or outer pair of roller sieve drums 40 are also of uniform diameter with each other, but of larger diameter than the inner pair 41, and also the ones 40 are horizontally aligned with relation to each other, but said alignment of the ones 40 is in a horizontal plane above the plane of the inner ones 41, for reasons to be explained.

A stub power shaft 10 is suitably journalled to the under side of the cart C, as illustrated, having a chain cog wheel keyed thereto, and there is a suitable cog wheel power take-off keyed to the rotatable axle of the cart, and a belt chain extends therefrom over the cog of shaft 10, in the conventional manner, though not illustrated. Two belt drum-shafts 11 are suitably journalled, for rotation, to the frame, being horizontally arranged and positioned just below the plane of the sieve cleaner drums, 40 and 41, and just above the plane of the top of the cart C, and an endless belt 22 rolls over said two drums 20. It is to be noted that belt rollers 20 are so constructed as to accommodate the belt 22, in endless rotation thereover, with one end of the belt extending to a point, for dirt discharge therefrom, which is beyond the top of the cart or outside of the cart, for reason to be explained. Said belt is designed to be moved toward that discharge point, by its rollers. The one shaft 11, which is outside the vertical plane of the cart, has a chain cog wheel keyed thereto, and a loop drive chain 21 extends over that cog wheel and the cog wheel of stub shaft 10. At the other end of the one of the belt drum shafts 11, which is the one of the two thereof which acts as the belt drive shaft, being at the same end of the belt which projects over the side of the cart, I provide a suitable power take-off, within a gear box 23, with a forty-five degree angle stub shaft and chain gear 24 keyed to that shaft, in the conventional manner. Referring to Figure 4, I drive the pairs of sieve-cleaner drums, 40 and 41, by threading an endless chain belt 42, as there illustrated, over the drive cog wheel 24, then over an idle gear 8, mounted as illustrated at the end of a spacer bar 25a, and then, proceeding from right to left as there illustrated, under sieve drum chain cogs of drums 40 and 41, and then over the sieve drum chain cogs of the last two drums, 41 and 40, respectively. It will be apparent that such chain drive connections will cause the upper surface of the belt 22 to be driven toward the side thereof indicated as X in Figure 2; and also at the same time will drive the pairs of cleaner sieve-drums, 40 and 41; that one larger one and one smaller one of each pair will rotate in the same direction, namely, toward the overall outside area of all of said drums, as indicated by directional arrows in the several views of the drawings; for reasons to be explained. A suitable guard shield, 43, could, if desired, be used at the side of the top of the area of the roller sieve-cleaner drums, opposite the digger machine conveyor 2, as illustrated in Figure 5 only, to keep the beets from rolling off that side. Each sieve-cleaner drum, 40 and 41, is constructed by welding spaced parallel discs together by means of parallel spaced peripheral bars 40a. The distance between the said bars of a wheel is such that the sugar beet will not enter therebetween. Likewise, the space between adjoining drums, 40 and 41, is such that a beet thereabove cannot fall down between the adjoining drums, nor between the central drums 40.

Before explaining the operation of my cleaner attachment, I will restate a few salient points of operation of the component parts of my attachment, for a clearer understanding. The endless dirt conveyor belt 22 moves from left to right, as illustrated in Figure 2, and is positioned to end beyond that right side of the cart C, so that the dirt collected and conveyed thereby is dumped by the belt at that side, indicated as X of said figure. As the cart C is drawn forwardly, by the tractor-digger machine T, power is derived from the axle of the cart, and that power is connected, by the cog and chain belt connections heretofore described, to so drive said belt 22, and also to drive the pairs of cleaner squirrel-cage sieve-like drums, 40 and 41, as indicated by the directional arrows of Figures 3 and 4. A small one of said drum wheels, such as the right hand one of the middle pair of smaller ones as shown in Figure 3, and its adjacent larger one, such as the right hand larger one in said figure, rotate in one outer direction, which with relation to Figure 3 parts just mentioned would be in a clockwise direction, and the other two of said pairs of sieve-drum-wheels rotate in the other direction or toward the other diametrically opposed outer direction, as indicated by directional arrows, which would be a counter-clockwise direction for the left two of said drums as illustrated in Figure 3. It is to be noted that the axes of the smaller ones of the pairs of said drums is in a lower horizontal plane than the axes of the larger ones of said pairs. My cleaner attachment is placed over the top of the loader cart, but being only partially of the area of that top there remains a space, indicated as Y, on each side thereof, which space is not covered by my attachment, and the cleaned beets B fall into the cart from the sides of the top of my attachment through said spaces Y. The bars of each of my sieve-cleaner drums, 40—41—41—40, are spaced so that the sugar beets will not pass therebetween; and, likewise, the distance between any two of said drums, as journalled on the frame, is so arranged that the sugar beets will not pass therebetween. The cart could be differently constructed, with relation to my cleaner attachment, for example the attachment could have a power take-off shaft connected directly with the tractor, instead of from the cart axle.

During operation of my attachment, the cleaning of the dug beets, as illustrated in Figures 3 and 4, is accomplished by the action of the beets on top of the contours of the four roller-like squirrel-cage sieve-cleaner-drums, 40—41—41 and 40. The beets from the digger machine conveyor 2 are dumped at the point above the center of my cleaning attachment, indicated as A in Figure 2. From point A, as illustrated in Figure 3, the beets are agitated on top of the constantly rotating cleaner drums, by a bouncing and rolling motion imparted to them by said drums, and in that action the dirt adhering to the beets is thereby loosened and thrown therefrom. That dirt "d" is further loosened as a result of the frictional rubbing of the beets, during such a rolling and bouncing action thereof, during each contact thereof with one or more of the sieve or cage bars 40a of each cleaner drum. The loosened dirt then falls downwardly through each drum and between the drums onto the moving dirt conveyor belt 22. The belt conveys that dirt to its discharge point X outside of the cart, where it falls on the ground when that point is reached by the belt. The cleaned beets are caused to be bounced upwardly and over the outside roller-sieve drums 40, by the bars 40a of each of the outside pair of outwardly turning cleaner drums, 40 and 41, as illustrated by the directional arrows. By outside, as just used, is meant to the side of the belt as distinguished from the direction of travel of the belt. On the beets leaving an outer roller, at each side of my attachment, as just defined, the cleaned beets then fall down through the space Y, beyond each side of the belt, into the receiving means, being in this instance a loading cart C, and the dirt, $d$, having been discharged outside of the cart by the dirt conveyor belt, only the cleaned beets are collected in the cart. The positioning of the two outside larger cleaner drums, 40, in a higher plane than the pair of inner ones 41, assures that the dirt particles, $d$, will fall freely from the beets B, and said dirt will not be carried with the beets into the car C by the outer rollers 40 to cart entrance points Y; and that action, of the outer rollers freeing the cleaned beets from the mass of uncleaned ones falling on the overall central area portion "A" of the upper surface of the cleaner drums, 40—41—41—40, is also accentuated by making the said outer higher elevated drums 40 of larger diameter than the pair of inner drums. Said elevating of the outer pair, and larger diameter of the outer pair, causes the cleaned beets to be elevated by the drums, 40, in an agitated and bouncing and rolling manner, which assures they are free of the dirt from other beets falling on the center of the attachment. Shield trough, 2a, guides the beets from the tractor onto central point, A, as illustrated.

It is to be understood that various changes and modifications may be made in the preferred embodiment of my invention here shown and described without deviating from the teaching and scope thereof. I therefore wish to be understood as being limited only by the scope of the hereunto appended claim.

What I claim and desire to secure by Letters Patent is:

In combination with a loader receiving open-top cart adapted for receiving freshly dug tuber vegetables from the elevator conveyor of a harvester digger machine, an attachment adapted for separating the dirt from the freshly dug tubers, comprising, frame means secured to said cart, a source of power, a horizontally operable endless conveyor belt positioned above said open top of the cart and with its discharge end extending beyond the cart, said conveyor belt being of a size to only partially cover the top portion area of the cart, a plurality of sieve cleaner drums each mounted on said frame and above said belt and each mounted for rotation, said drums having their axes in parallel close relationship with each other and with said axes positioned parallel with the direction of travel of the belt, means for connecting the belt with the power means for effecting rotation of the belt, and means for connecting the drums with said power means for effecting rotation of the drums, the extreme outside ones of said drums being in a horizontal plane above the other thereof, and each of said drums having peripheral spaced squirrel-cage bars thereon, said bars of a drum being close enough to prevent a tuber from passing therethrough.

RUSSELL RICHARD SHULER.

REFERENCES CITED

The following references are of record in the file of this patent:

UNITED STATES PATENTS

| Number | Name | Date |
| --- | --- | --- |
| 3,832 | Packard | Nov. 18, 1844 |
| 324,997 | Hershberger | Aug. 25, 1885 |
| 703,707 | Moran | July 1, 1902 |
| 747,771 | Richter | Dec. 22, 1903 |
| 860,147 | Orton | July 16, 1907 |
| 1,019,754 | Bruce | Mar. 12, 1912 |
| 1,444,009 | Schroeder | Feb. 6, 1933 |
| 1,920,701 | Jenkins | Aug. 1, 1933 |
| 1,941,147 | Tohlige | Dec. 26, 1933 |
| 2,257,352 | Silver | Sept. 30, 1941 |
| 2,269,298 | Widuch | Jan. 6, 1942 |
| 2,370,539 | Hodecker | Feb. 27, 1945 |
| 2,404,629 | Griff | July 23, 1946 |
| 2,441,244 | Kimball | May 11, 1948 |
| 2,453,714 | La Pointe | Nov. 16, 1948 |
| 2,531,379 | Checkering | Nov. 28, 1950 |
| 2,562,400 | Urschel | July 31, 1951 |

FOREIGN PATENTS

| Number | Country | Date |
| --- | --- | --- |
| 2,394 | Great Britain | Sept. 18, 1866 |
| 43,450 | Austria | Aug. 10, 1910 |
| 265,562 | Italy | June 21, 1929 |
| 616,610 | Germany | Sept. 3, 1932 |
| 598,306 | Germany | Oct. 4, 1932 |
| 615,972 | Germany | Oct. 29, 1932 |
| 65,050 | Norway | July 20, 1942 |